(12) United States Patent
Naruse

(10) Patent No.: US 8,650,380 B2
(45) Date of Patent: Feb. 11, 2014

(54) PROCESSOR AND ARITHMATIC OPERATION METHOD

(75) Inventor: Akira Naruse, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 288 days.

(21) Appl. No.: 12/843,282

(22) Filed: Jul. 26, 2010

(65) Prior Publication Data

US 2011/0029755 A1    Feb. 3, 2011

(30) Foreign Application Priority Data

Jul. 28, 2009   (JP) ................................ 2009-175104

(51) Int. Cl.
*G06F 12/00*     (2006.01)

(52) U.S. Cl.
USPC ........... 711/206; 711/137; 711/207; 711/213; 711/E12.001; 711/E12.061

(58) Field of Classification Search
USPC .................. 711/137, 206, 207, 213, E12.001, 711/E12.061
See application file for complete search history.

(56) References Cited

U.S. PATENT DOCUMENTS

| 5,860,096 | A  * | 1/1999 | Undy et al. ................... 711/122 |
| 2009/0077423 | A1 * | 3/2009 | Kim et al. ...................... 714/36 |
| 2011/0010521 | A1 * | 1/2011 | Wang et al. ................... 711/207 |

FOREIGN PATENT DOCUMENTS

JP            3-257643  A    11/1991

* cited by examiner

*Primary Examiner* — Midys Rojas
(74) *Attorney, Agent, or Firm* — Fujitsu Patent Center

(57) ABSTRACT

A processor has a first table including an entry that associates a logical address with a physical address of a page that manages a virtual space address. The processor determines, when a target logical address accessed by one of threads is translated to the physical address, whether an entry corresponding to the target logical address is present in the first table, the target logical address is of a page accessed by a program. The processor determines, when the entry corresponding to the target logical address is not present in the first table, whether the target logical address has been accessed during the running of the program. The processor delays, when the target logical address has not yet been accessed, the process of reading the entry corresponding to the target logical address from a page table into the first table by a predetermined time to thereby delay the one thread.

12 Claims, 6 Drawing Sheets

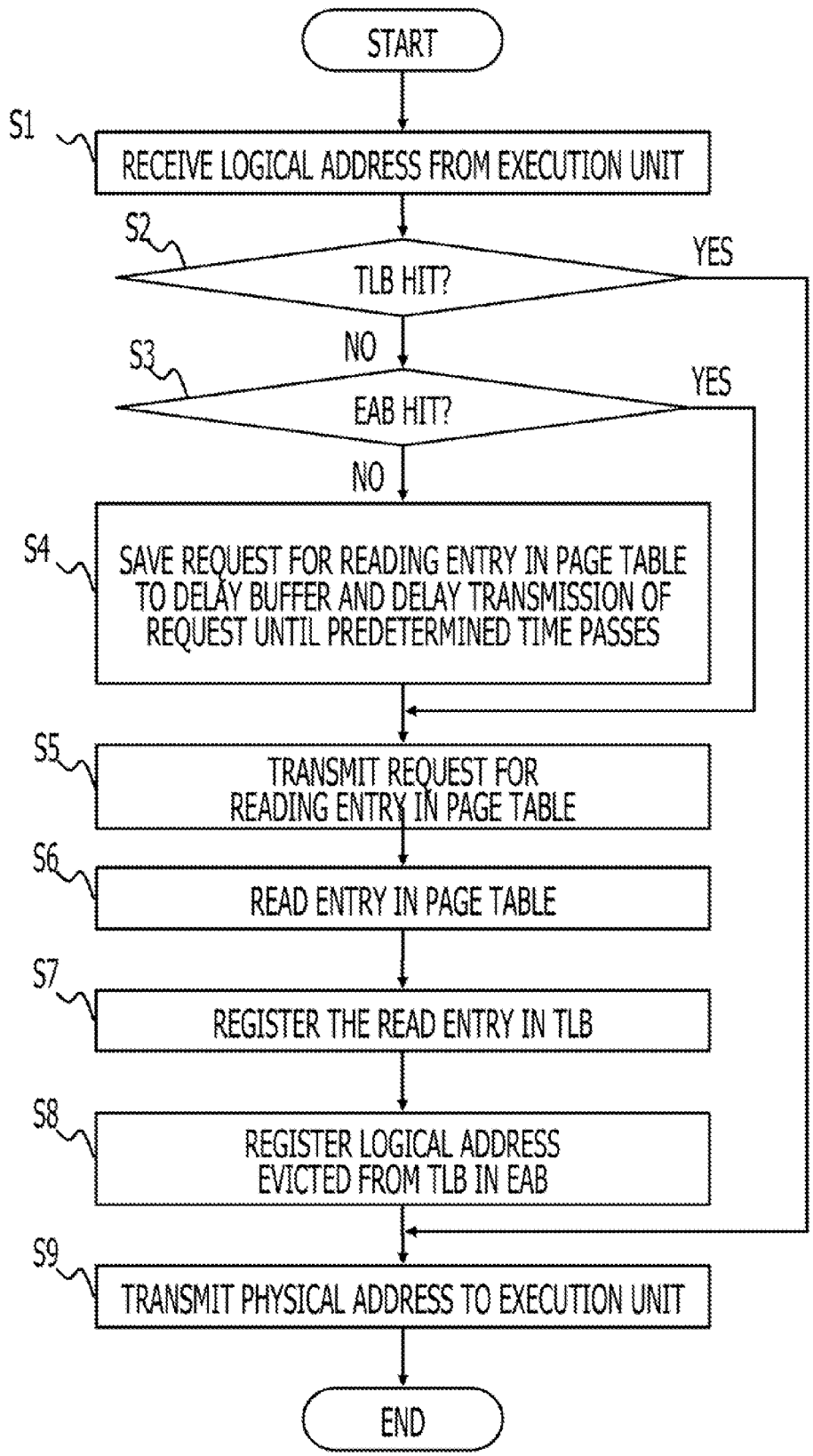

PROCESSOR AND ARITHMATIC OPERATION METHOD

CROSS-REFERENCE TO RELATED APPLICATIONS

This application is based upon and claims the benefit of priority of the prior Japanese Patent Application No. 2009-175104, filed on Jul. 28, 2009, the entire contents of which are incorporated herein by reference.

FIELD

The present invention relates to technology for managing memory using virtual memory.

BACKGROUND

In a processor that executes a program using virtual memory, a memory management unit (hereinafter referred to as an MMU) performs translation from logical addresses to physical addresses in the virtual memory. To achieve high-speed address translation, the MMU generally uses a translation look-aside buffer (hereinafter referred to as a TLB). The TLB functions as a cache of a page table stored in a storage unit and includes entries that associate logical addresses and physical addresses of the individual pages of storage areas divided by the MMU. The MMU translates the logical address of a target page accessed by the program to a physical address on the basis of an entry in the TLB.

Since the TLB is a buffer installed in a processor, it can be accessed at high speed but has small data storage capacity. The TLB can therefore include merely a limited number of entries. Meanwhile, a technology for improving the performance of a processor by increasing the number of threads that can be executed simultaneously on a processor has recently been advancing. Therefore, the number of TLB entries needs to be increased with an increase in the number of threads. However, since it is generally difficult to increase the number of TLB entries while keeping access latency, the number of TLB entries per thread decreases. This increases the frequency of TLB misses in which entries corresponding to the logical addresses of target pages accessed by individual threads are not present in the TLB, thus causing TLB thrashing.

As a solution to such a TLB miss, for example, the MMU reads an entry corresponding to a target logical address from a page table. However, the page table is generally stored in a storage unit outside the processor. Therefore, much time is required to read the entry from the page table.

SUMMARY

A processor in which a plurality of threads operate has a first table including an entry that associates the logical address with the physical address of a page that manages a virtual space address. The processor has a first determination section that determines, when a logical address that is accessed by one of the plurality of threads is translated to a physical address, whether an entry corresponding to the target logical address of a page accessed by a running program is present in the first table. The processor has a second determination section that determines, when the entry corresponding to the target logical address is determined not to be present in the first table, whether the target logical address has been accessed during execution of the program. The processor has a delay control section that delays, when it is determined that the target logical address has not yet been accessed, the process of reading the entry corresponding to the target logical address from a page table into the first table by a predetermined time to thereby delay the one thread.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF THE DRAWINGS

FIG. 6 is a flowchart illustrating the operations of the MMU control unit.

DESCRIPTION OF EMBODIMENTS

Figure 1:
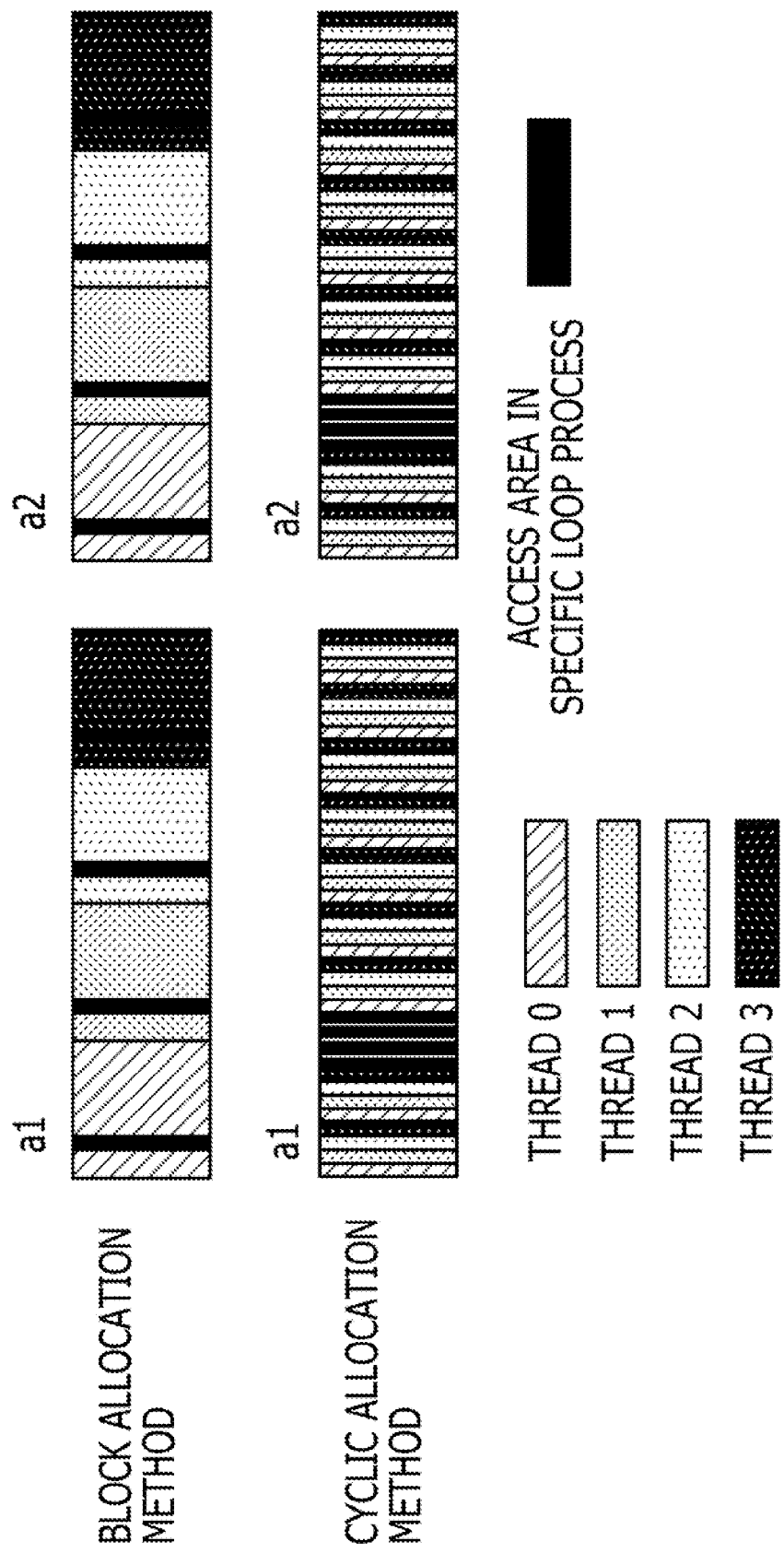
FIG. 1 is an explanatory diagram of storage areas accessed using a block allocation method and a cyclic allocation method.

A technology is proposed as a technology for speeding up address translation from a logical address to a physical address in the event of a TLB miss. Specifically, the MMU is provided with a two-step TLB. Even if a TLB miss occurs in a first TLB, the MMU can perform address translation to a physical address using a corresponding entry in a second TLB, if present.

However, this technology can reduce the frequency of access to the page table by providing the two-step TLB but still needs the redundant process of referring to the second TLB if a TLB miss occurs in the first TLB. If the frequency of occurrence of TLB misses in the first TLB can be decreased, the MMU can further speed up address translation from a logical address to a physical address.

First, the mechanism of the occurrence of TLB thrashing during the execution of a program using virtual memory will be described.

Operating frequencies of the processor cores of computers have recently reached a physically feasible upper limit as a result of a leap upward in the operating frequencies and thus further improvement in operating frequency has become difficult. Therefore, to improve processor performance by another method, multi-cores that improve processor performance by increasing the number of processor cores are generally adopted. Another method, such as a simultaneous multi-threading technology (SMT) that executes a plurality of threads simultaneously on one processor core, has also been adopted. The number of threads that are simultaneously executed on a processor tends to increase as such multi-cores and SMT are adopted. An example of a processor having a large number of threads that are executed simultaneously is a graphic processing unit (GPU).

In a processor having a large number of threads that are executed simultaneously, the large number of threads access a storage unit simultaneously. Therefore, the MMU simultaneously perform address translation from logical addresses to physical addresses for the large number of threads using a TLB. However, the number of entries that may be included in the TLB has an upper limit. Therefore, if a large number of threads are executed simultaneously, the number of pages that are accessed simultaneously may exceed the number of entries included in the TLB. This will increase the frequency of TLB misses, thus causing TLB thrashing.

Thus, as a method for preventing TLB thrashing, it is effective to reduce the number of pages that are accessed simultaneously. To reduce the number of pages that are accessed simultaneously, it is effective to localize and not to disperse storage areas to be accessed as much as possible.

One of methods for localizing storage areas to be accessed is a method that creates storage area allocation. For simultaneous and parallel access of a plurality of threads to continuous data areas, there are a block allocation method and a cyclic allocation method as a method for allocating storage areas to be processed by the individual threads. The block allocation method is a method of allocating areas obtained by dividing the storage area by the number of threads to the individual threads. On the other hand, the cyclic allocation method is a method of cyclically allocating a small storage area to each thread.

FIG. 1 illustrates, for a case in which a program described by the code shown below is processed in data parallel using four threads (threads 0 to 3), storage areas that are accessed simultaneously using the four threads during the execution of a specific loop process.

```
for (i=0; i<N; i++) {
    sum+=a1[i]*a2[i];
}
```

In FIG. 1, a memory space represented by "$a_1$" corresponds to an array a1 in the above code, and "a2" corresponds to an array a2 in the above code.

As is evident from FIG. 1, with the block allocation method, the areas to be accessed by the individual threads are dispersed, which increases the number of pages to be accessed simultaneously. On the other hand, with the cyclic allocation method, the areas to be accessed by the individual threads are localized. This decreases the number of pages to be accessed simultaneously. Thus, when the same program is executed with the same number of threads, the number of pages to be accessed simultaneously is smaller by the cyclic allocation method than by the block allocation method. Therefore, adopting the cyclic allocation method leads to a decrease in TLB misses.

However, even if the cyclic allocation method is adopted to allocate data, TLB thrashing may yet occur because of the following reason.

Most of program execution models adopted in processors having a large number of simultaneously executed threads are single program multiple data (SPMD) that does not need synchronization among threads. This is because SPMD enables threads to be executed in order from an executable thread, which reduces processor idle time, thus providing high performance, as compared with single instruction multiple data (SIMD) that needs synchronization among threads.

However, SPMD causes differences in advance speed among threads because of a lack of synchronization. As the differences in advance speed among threads increase, access areas by individual threads will be dispersed even by the cyclic allocation method. This is because a high-speed thread processes the following index array earlier than the other threads and therefore accesses a new storage area ahead of the other threads.

Figure 2:
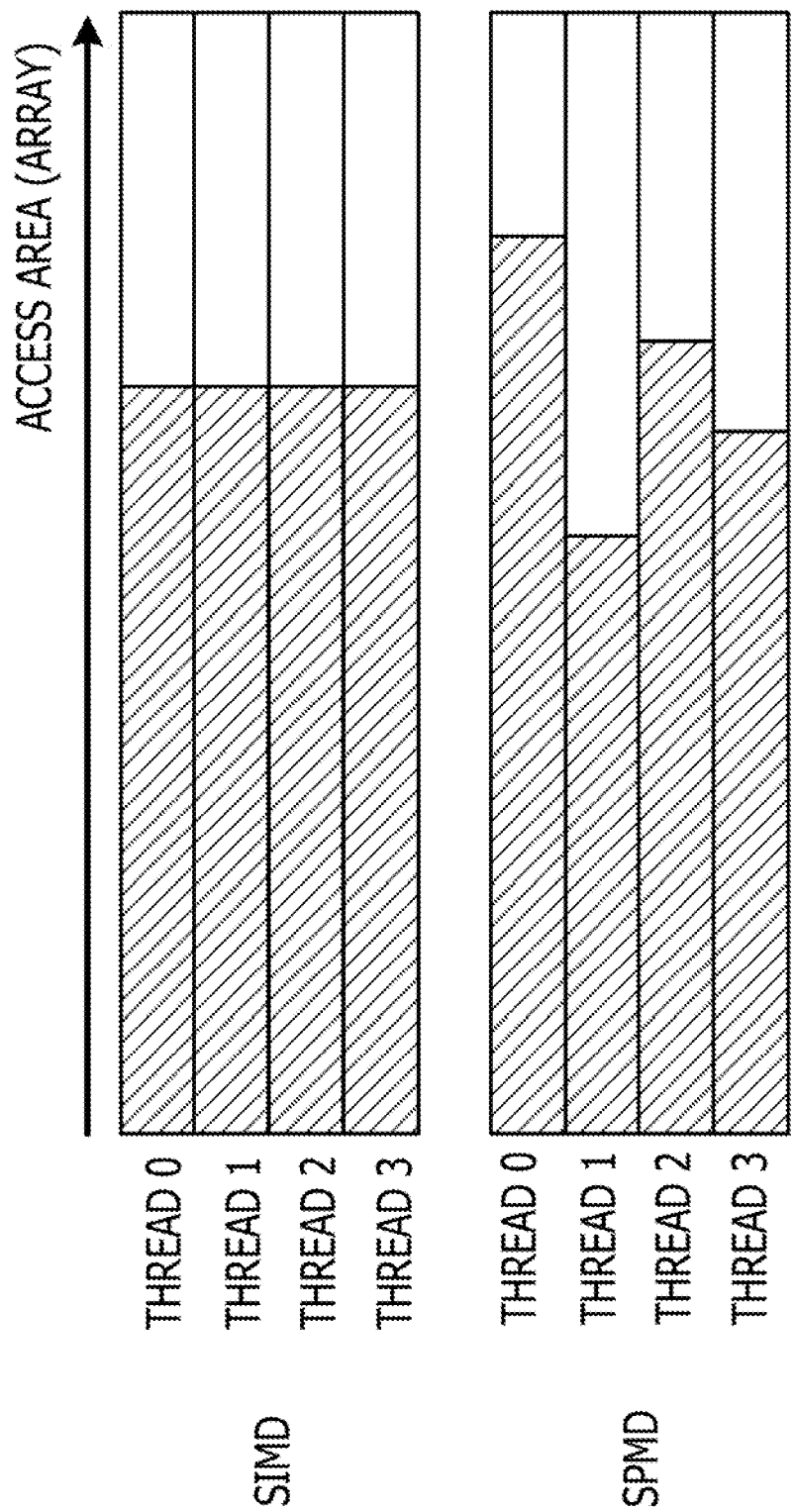
FIG. 2 is an explanatory diagram of storage areas accessed using SIMD and SPMD.

FIG. 2 is a diagram that clearly illustrates the relationship between the dispersion state of storage areas accessed by threads (thread 0 to thread 3) and differences in thread advance speed in the case where its program execution model is SIMD and SPMD. As shown in FIG. 2, with SIMD that causes little difference in advance speed among threads, access areas by the individual threads are localized, while in the case of SPMD that is prone to cause differences in advance speed among threads, access areas by the individual threads are dispersed. As a result, with the SPMD, the number of pages that are accessed simultaneously increases, and TLB misses occur frequently, thus causing TLB thrashing.

Figure 3:
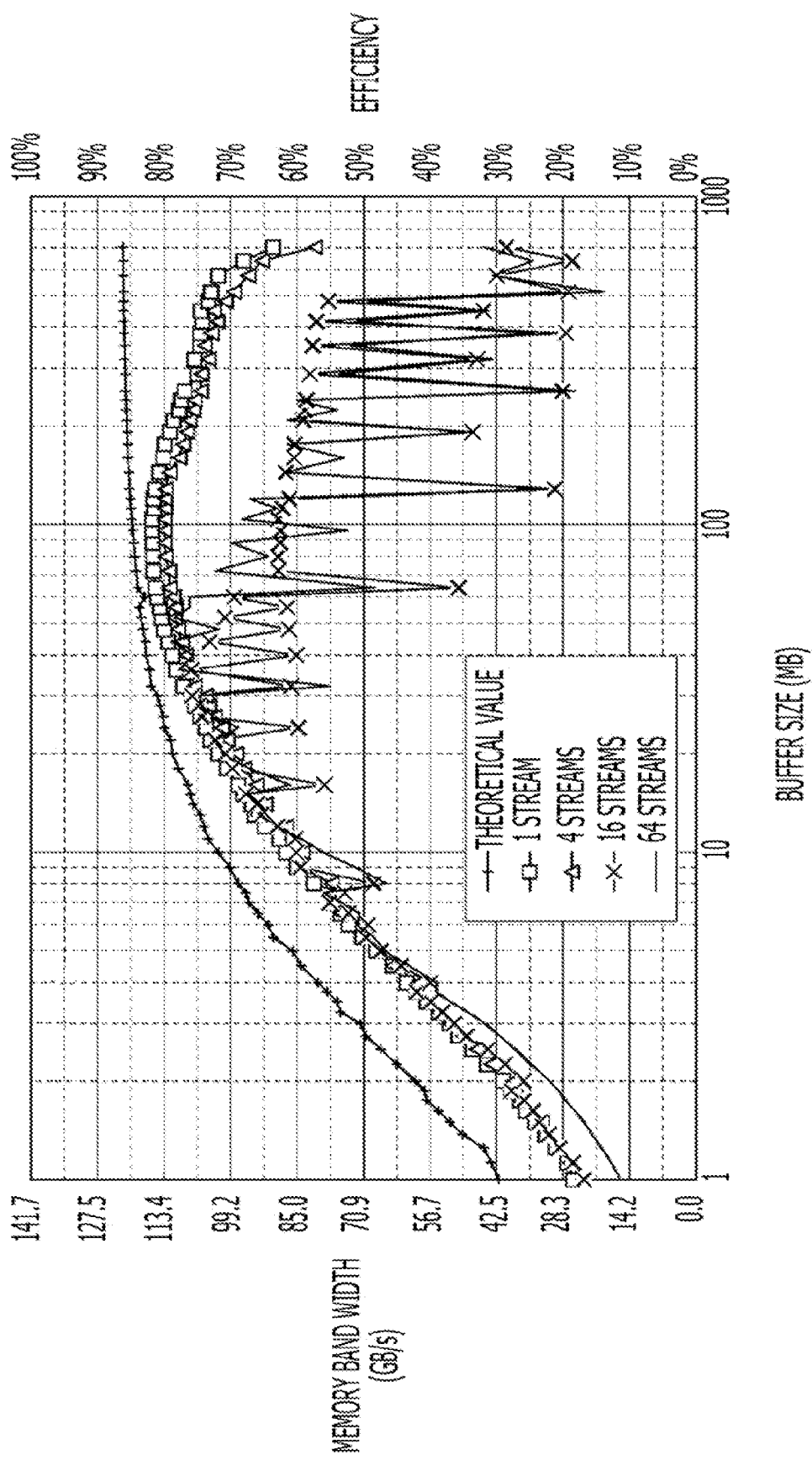
FIG. 3 is a diagram of measurements of memory bandwidth during execution of a program in the case where the advance speeds of threads are not adjusted.

FIG. 3 illustrates the measurements of memory bandwidth in the case where a program for copying data in a certain storage area to another storage area was executed using an SPMD execution model. The vertical axis represents memory bandwidth measured during the execution of the program. The horizontal axis represents buffer sizes used in the copy process. The buffer sizes are of storage areas accessed in the copy process (the total storage area of copy sources and copy destinations). The measurements show memory bandwidth corresponding to the number of streams (arrays) (1 stream, 4 streams, 16 streams, and 64 streams) that are used simultaneously in the copy process in contrast with theoretical values.

As shown by the measurements in FIG. 3, if a storage area accessed is sufficiently large, the memory band width tends to decrease as the number of streams increases. In such a case where a storage area accessed is sufficiently large and the number of streams is large, the number of pages that are accessed simultaneously is large. The tendency to a decrease in memory band width in such a case indicates a high possibility that TLB misses occur frequently in MMU to cause TLB thrashing, thereby decreasing processing efficiency.

To prevent the occurrence of TLB thrashing in such an SPMD execution model, it is effective to reduce the differences in advance speed among the threads, because this may localize storage areas that are accessed simultaneously by the individual threads, thereby reducing the number of pages that are accessed simultaneously. Such differences in advance speed among the threads may be reduced to some extent by making a modification of adding a synchronizing process into the program.

Figure 4:
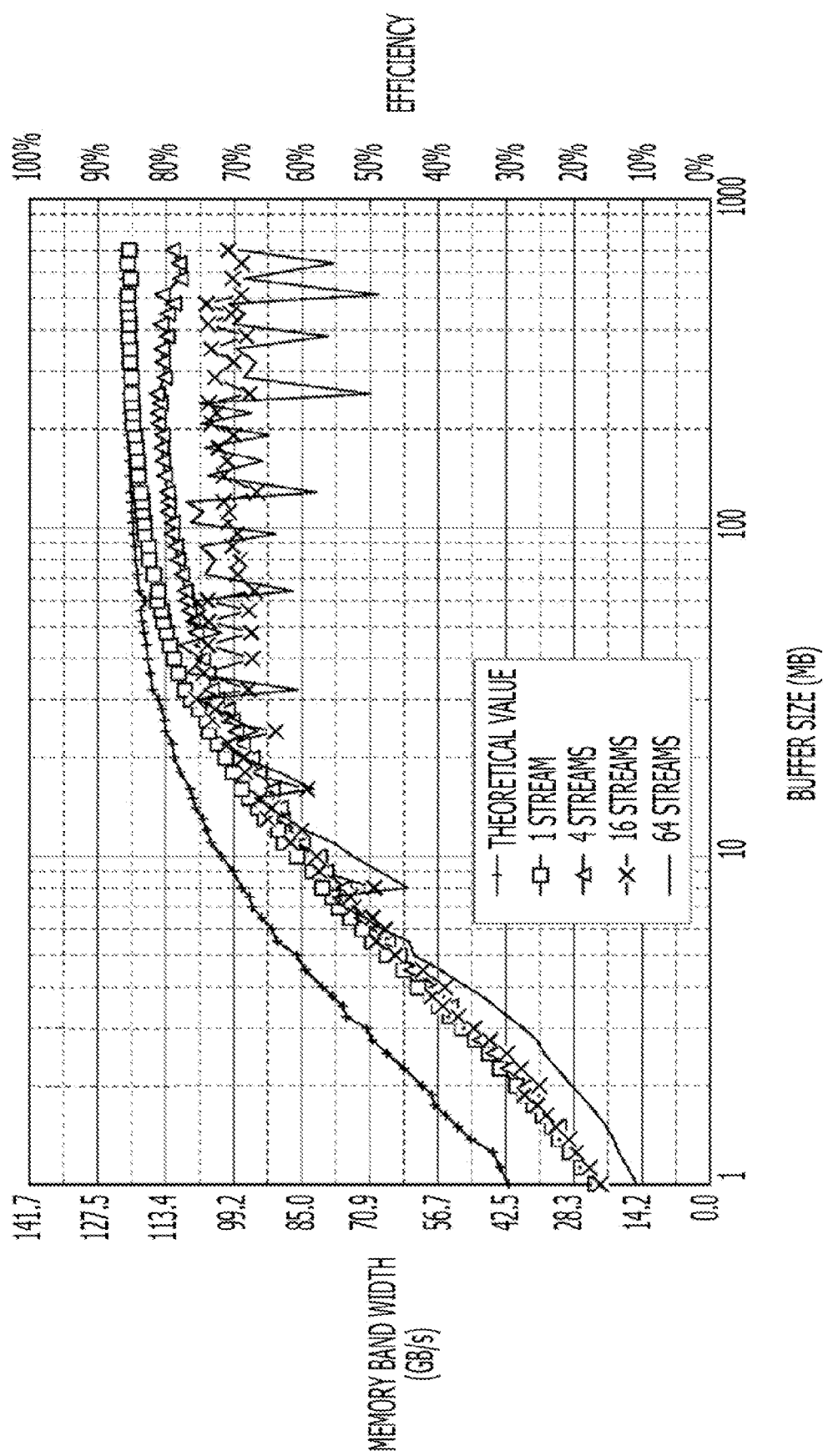
FIG. 4 is a diagram of measurements of memory bandwidth during execution of a program in the case where the advance speeds of threads are adjusted.

FIG. 4 shows re-measurements obtained after the modification of adding the synchronizing process into the program is made under the memory-band-width measurement conditions shown in FIG. 3. A comparison of FIG. 4 and FIG. 3 shows that the decrease in memory band width becomes smaller even if the storage area accessed is sufficiently large and the number of streams is large. The measurements show that the occurrence of TLB thrashing is reduced by decreasing the differences in advance speed among the threads.

However, to make the modification of adding an appropriate synchronizing process to the program, it is desirable for a program developer to understand its processor architecture, and such a modification requires high-level knowledge. It is therefore more desirable to reduce the differences in advance speed among threads by a method that does not need modification to the program.

A memory management mechanism capable of reducing differences in advance speed among threads will be described hereinbelow.

The memory management mechanism reduces differences in advance speed among threads using the characteristic that a high-speed thread tends to access a new storage area ahead of the other threads. Specifically, the memory management mechanism delays a TLB-miss solving process in the case where a TLB miss has occurred during execution of a program and when a logical address related to the TLB miss is a new address that has not yet been accessed in the executed program. This allows the memory management mechanism to delay the advance of high-speed threads, thereby adjusting differences in advance speed among the threads.

Figure 5:
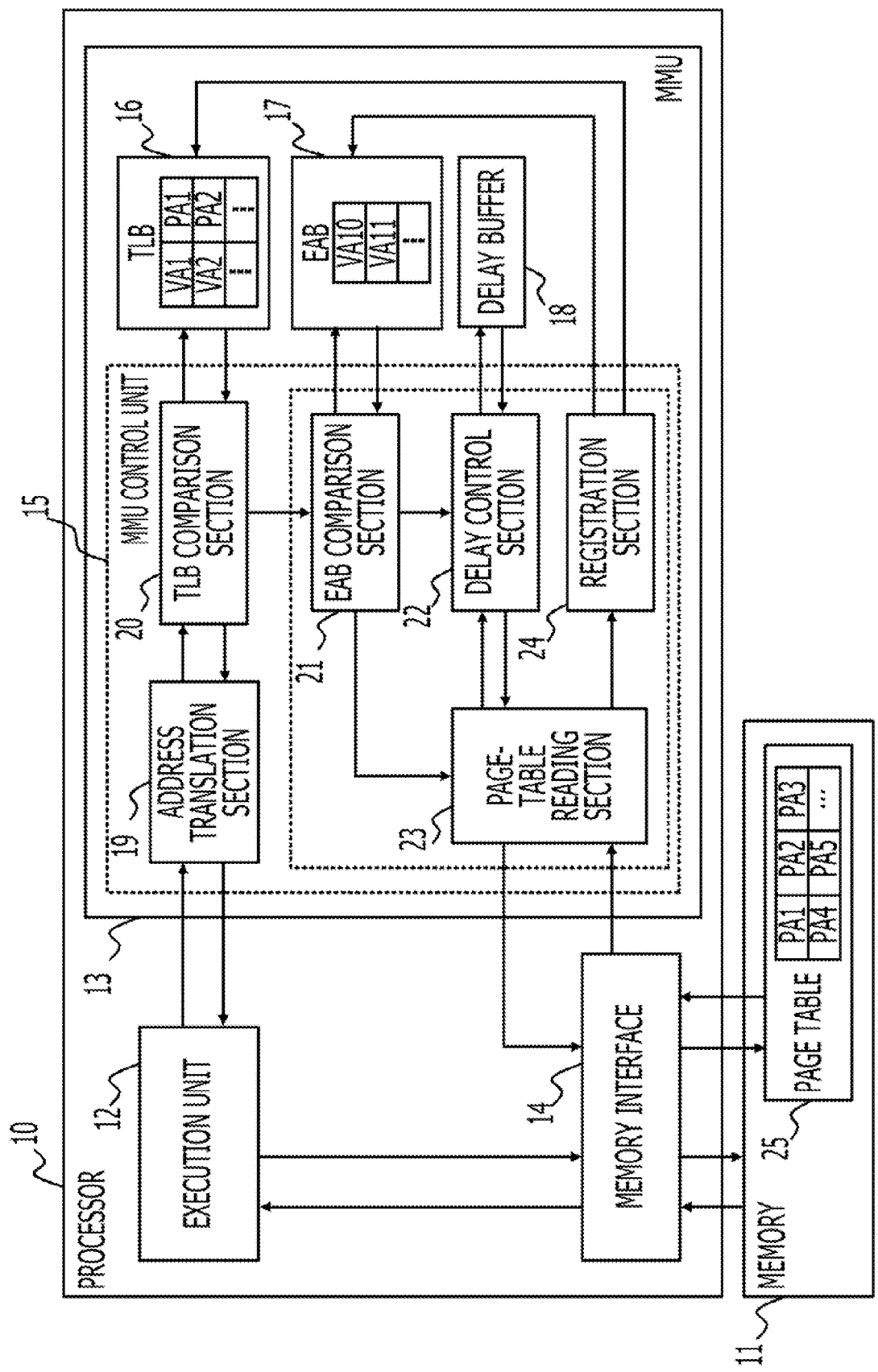
FIG. 5 is a block diagram of a computer system including a memory management mechanism according to an embodiment.

FIG. 5 is a block diagram of a computer system including the memory management mechanism according to an embodiment. The computer system includes a processor 10 and a memory 11. The processor 10 and the memory 11 are connected to each other via an external bus.

The processor 10 includes an execution unit 12, an MMU 13, and a memory interface 14. In the processor 10, the execution unit 12, the MMU 13, and the memory interface 14 are connected to one another via an internal bus.

The execution unit 12 is a unit that executes program instructions stored in the memory 11 and includes a control unit, an arithmetic logic unit, an instruction decoder, etc. The execution unit 12 executes arithmetic and logical operations using the arithmetic logic unit in response to a control signal output from the control unit in accordance with a program instruction decoded by the instruction decoder. When an access request to the memory 11 is generated in the running process, the execution unit 12 transmits the logical address of a page including the logical address to be accessed (hereinafter referred to as "target logical address") to the MMU 13. The execution unit 12 receives a physical address corresponding to the target logical address from the MMU 13 and accesses the memory 11 via the memory interface 14 using the physical address and an in-page offset.

The MMU 13 divides a storage area in the memory 11 into pages and manages them. The MMU 13 translates a logical address to a physical address in virtual memory. The MMU 13 includes an MMU control unit 15, a TLB 16, an evicted-address buffer (EAB) 17, and a delay buffer 18.

The MMU control unit 15 is, for example, a micro-program control mechanism or a combination of logical circuits. The MMU control unit 15 translates a target logical address received from the execution unit 12 to a physical address using the TLB 16 and returns the physical address to the execution unit 12.

The TLB 16 is a buffer including entries that associate logical addresses with physical addresses corresponding to the logical addresses. The structure of the entries in the TLB 16 includes logical addresses (abbreviated as VAs (virtual addresses) in FIG. 5) and physical addresses (abbreviated as PAs (physical addresses) in FIG. 5). The TLB 16 is provided in the MMU 13 and functions as a cache of a page table 25, described later. The MMU control unit 15 may therefore translate a logical address to a physical address at high speed by using the TLB 16. The number of entries in the TLB 16 has an upper limit. Thus, the TLB 16 includes entries corresponding to individual logical addresses from the logical address of a page accessed last to the logical address of a page that is accessed the upper limit of the entries in the TLB 16 before at the maximum during the execution of the program. The TLB 16 corresponds to a first table.

The EAB 17 is a buffer in which logical addresses may be stored and the logical addresses of pages that have been accessed are stored. Specifically, the EAB 17 is a buffer in which the addresses of page entries evicted from the TLB are stored. The EAB 17 corresponds to a second table.

The delay buffer 18 is a buffer in which data related to a request for reading an entry from the page table 25, described later, is temporarily saved.

The memory 11 is a storage unit, for example, a main storage unit or a cache memory. The memory 11 includes instruction data of a program to be executed and data to be processed, as well as the page table 25 including entries that associates logical addresses with physical addresses. In the example of FIG. 5, the structure of the entries in the page table 25 includes physical addresses. The arrangement of the physical addresses itself indicates logical addresses so that the individual entries associate the logical addresses with the physical addresses. The page table 25 and instruction data of a program and data to be processed do not need to be present in the same unit; for example, the page table 25 may be present in the cache memory, and the processing object data of the program may be present in the main storage unit.

Next, the components and functions of the MMU control unit 15 will be described in detail. The MMU control unit 15 includes an address translation section 19, a TLB comparison section 20, an EAB comparison section 21, a delay control section 22, a page-table reading section 23, and a registration section 24. FIG. 6 is a flowchart illustrating the operations of the MMU control unit 15. Referring to FIGS. 5 and 6, the operations of the individual components of the MMU control unit 15 will be described below. The TLB comparison section 20 functions as a first determination section or a first determination feature. The EAB comparison section 21 functions as a second determination section. Furthermore, the delay control section 22 functions as a delay control section or a delay control feature.

First, the address translation section 19 receives a target logical address from the execution unit 12 (S1). The TLB comparison section 20 compares the target logical address with the logical addresses of entries included in the TLB to determine whether an entry corresponding to the target logical address is present in the TLB 16 (S2). If an entry corresponding to the target logical address is present in the TLB 16 (a TLB hit: Yes), then the process moves to the operation in S9, described below. In contrast, if an entry corresponding to the target logical address is not present in the TLB 16 (a TLB miss: No), then the EAB comparison section 21 compares the target logical address with the logical addresses of entries included in the EAB 17 to determine whether the target logical address is present in the EAB 17 (S3). If the target logical address is present in the EAB 17 (an EAB hit: Yes), then the process moves to the operation in S5, described later. In contrast, if the target logical address is not present in the EAB 17 (an EAB miss: No), the delay control section 22 controls the operation of the page-table reading section 23. Specifically, the delay control section 22 saves data related to an instruction transmitted by the page-table reading section 23 for reading entries in the page table 25 to the delay buffer 18 for a predetermined time. In other words, the delay control section 22 delays reading of the entries in the page table 25 until the predetermined time passes (S4). The delay time is, for example, a time that is set in advance by the delay control section 22, using a clock number or the like.

The page-table reading section 23 transmits the data related to the instruction, stored in the page table 25, for reading an entry corresponding to the target logical address to the memory interface 14 (S5). The page-table reading section 23 reads the entry corresponding to the target logical address, stored in the page table 25, from the memory interface 14 (S6). The registration section 24 registers a new entry that associates the target logical address with a physical address indicated by the entry read from the page table 25 in the TLB

16 (S7). If the number of entries in the TLB 16 has already reached an upper limit in S7, the registration section 24 registers the new entry instead of the oldest entry registered in the TLB 16. In this case, the registration section 24 registers the oldest entry in the TLB 16, i.e., the logical address of an entry evicted from the TLB 16, in the EAB 17 (S8).

The address translation section 19 translates the target logical address to a physical address corresponding to the target logical address on the basis of the entry in the TLB 16. In other words, the address translation section 19 transmits a physical address indicated by an entry in the TLB 16 corresponding to the target logical address to the execution unit 12 (S9).

With the above components, the memory management mechanism performs the following operations when translating a target logical address to a physical address. When a TLB miss has occurred, the memory management mechanism delays the timing of address translation if the target logical address is the logical address of a page that has not yet been accessed during execution of the program. This may delay address translation of a thread that accesses the logical address of a page that has not yet been accessed during the execution of the program, that is, address translation of high-speed threads, thereby delaying the advance of the high-speed threads. This allows differences in advance speed among the threads to be adjusted.

Specifically, when a TLB miss has occurs, the memory management mechanism performs the following operations as a solution thereto. The memory management mechanism registers a new entry corresponding to a target logical address in the TLB 16 and registers a logical address evicted from the TLB 16 in the EAB 17. This causes a logical address in which a TLB miss has occurred and whose page has already been accessed during execution of the program is included in at least one of the TLB 16 and the EAB 17. In other words, there is a high possibility that a logical address in which a TLB miss has occurred and which is not present also in the EAB 17 is the logical address of a page that has not yet been accessed during execution of the program.

On receiving a target logical address from the execution unit 12, the memory management mechanism determines whether the logical address is a logical address in which a TLB miss has occurred and which is not present also in the EAB 17. In other words, the memory management mechanism determines whether the target logical address is the logical address of a page that has not yet been accessed during execution of the program. If there is a high possibility that the target logical address is the logical address of a page that has not yet been accessed during execution of the program, the memory management mechanism delays transmission of data related to an instruction to read entries stored in the page table 25 by a predetermined time. This delays the timing of registration of an entry corresponding to the logical address with the TLB 16. This results in a delay in the timing of returning the physical address to the execution unit 12 and a delay in the timing at which the execution unit 12 may access the memory 11. This may therefore delay the advance of high-speed threads, thereby adjusting differences in advance speed among the threads. The memory management mechanism may therefore reduce differences in advance speed among the threads, as in the case where the modification of adding the synchronizing process to the program is made.

Furthermore, the reduction of differences in advance speed among the threads increases the tendency of localization of storage areas that are accessed simultaneously by the individual threads during execution of the program. This therefore decreases the number of pages that are accessed simultaneously by the individual threads of the program and reduces the frequency of occurrence of TLB misses. As a result, this may prevent the occurrence of TLB thrashing, and speed up address translation from a logical address to a physical address, thus reducing program execution time.

The memory management mechanism uses the EAB 17 to determine whether a target logical address is a logical address that has already been accessed. However, the memory management mechanism may use not only the method using the EAB 17 but also any method that may determine whether a target logical address is a logical address that has already been accessed.

In the memory management mechanism, the delay control section 22 delays translation from a logical address to a physical address by delaying the timing of reading an entry from the page table 25 using the delay buffer 18. However, the method for delaying address translation is not limited thereto. For example, the delay control section 22 may perform delay control by a method other than the method using the delay buffer 18. The delay control section 22 may delay the operation of registering a new entry with the TLB 16 after reading entries in the page table 25. This may also delay the timing of translation from a target logical address to a physical address, thus delaying the advance of high-speed threads.

Furthermore, in the memory management mechanism, the registration section 24 registers the logical address of an entry evicted from the TLB 16 in the EAB 17. However, for example, the registration section 24 may register all target logical addresses received from the execution unit 12 in the EAB 17. The registration section 24 may not register duplicate logical addresses in the EAB 17. This also allows the memory management mechanism to determine whether a target logical address has been accessed during execution of the program.

According to the embodiment described above, differences in advance speed among the threads may be adjusted. This results in an increase in the tendency of localization of storage areas that are accessed simultaneously by the individual threads during execution of the program, thus decreasing the number of pages accessed simultaneously. This may therefore reduce the frequency of occurrence of TLB misses, prevent or at least reduce the occurrence of TLB thrashing, and speed up address translation from a logical address to a physical address, thus reducing program execution time.

All examples and conditional language recited herein are intended for pedagogical purposes to aid the reader in understanding the invention and the concepts contributed by the inventor to furthering the art, and are to be construed as being without limitation to such specifically recited examples and conditions. Although the embodiment(s) of the present inventions have been described in detail, it should be understood that the various changes, substitutions, and alterations could be made hereto without departing from the spirit and scope of the invention.

What is claimed is:

1. A processor in which a plurality of threads operate, the processor comprising:
 a first table including an entry that associates a logical address with a physical address of a page that manages a virtual space address;
 a first determination section that determines, when a target logical address that is accessed by one of a plurality of threads is translated to a physical address, whether an entry corresponding to the target logical address is present in the first table, whereby the target logical address is of a page accessed by a running program;

a second determination section that determines, when the entry corresponding to the target logical address is determined not to be present in the first table, whether the target logical address has been accessed during the running of the program; and a delay control section that delays, when it is determined that the target logical address has not yet been accessed, a process of transmitting a request for reading the entry corresponding to the target logical address from a page table into the first table by a predetermined time to thereby delay the one thread, wherein the predetermined time is a time that is set in advance by the delay control section, and transmits the request without delay of the predetermined time, when it is determined that the target logical address has been accessed.

2. The processor according to claim 1, the processor further comprising:

a second table including a logical address of an entry deleted from the first table;

wherein when the target logical address is not present in the second table, the second determination section determines that the target logical address has not yet been accessed.

3. The processor according to claim 1, wherein after request data related to a reading by the delay control section is saved in a save area for a predetermined time, the delay control section transmits the request data.

4. The processor according to claim 1, wherein when the number of entries in the first table agrees with an upper limit of entries to be registered in the first table, the oldest entry registered in the first table is deleted, and a logical address indicated by the oldest entry is registered in a second table.

5. A device including the processor according to claim 1.

6. The processor according to claim 1, wherein the delay time is a clock number.

7. The processor according to claim 1, wherein the predetermined delay time set in advance is a constant time.

8. An arithmetic operation method for a processor in which a plurality of threads operate, the method comprising:

determining, when a target logical address that is accessed by one of the plurality of threads is translated to a physical address, whether an entry corresponding to the target logical address of a page accessed by a running program is present in a first table included in the processor;

determining, when the entry corresponding to the target logical address is determined not to be present in the first table, whether the target logical address has been accessed during the running of the program; and delaying, when it is determined that the target logical address has not yet been accessed during the running of the program, transmitting a request for a reading of the entry corresponding to the target logical address from a page table into the first table by a predetermined time to thereby delay the one thread that accesses the target logical address, wherein the predetermined time is a delay time set in advance, and transmitting the request without delay of the predetermined time, when it is determined that the target logical address has been accessed.

9. The method according to claim 8, wherein the processor includes a second table, the second table including a logical address of an entry deleted from the first table; and wherein the determining whether the target logical address has been accessed includes determining that the target logical address has not yet been accessed when the target logical address is not present in the second table.

10. The method according to claim 8, wherein the reading of the entry corresponding to the target logical address includes:

after request data related to the reading process is saved in a save area for a predetermined time, transmitting the request data.

11. The method according to claim 8, wherein when the number of entries in the first table agrees with an upper limit of entries to be registered in the first table, the oldest entry registered in the first table is deleted, and a logical address indicated by the oldest entry is registered in a second table.

12. The method according to claim 8, wherein the delay time is a clock number.

* * * * *